Figure 1:
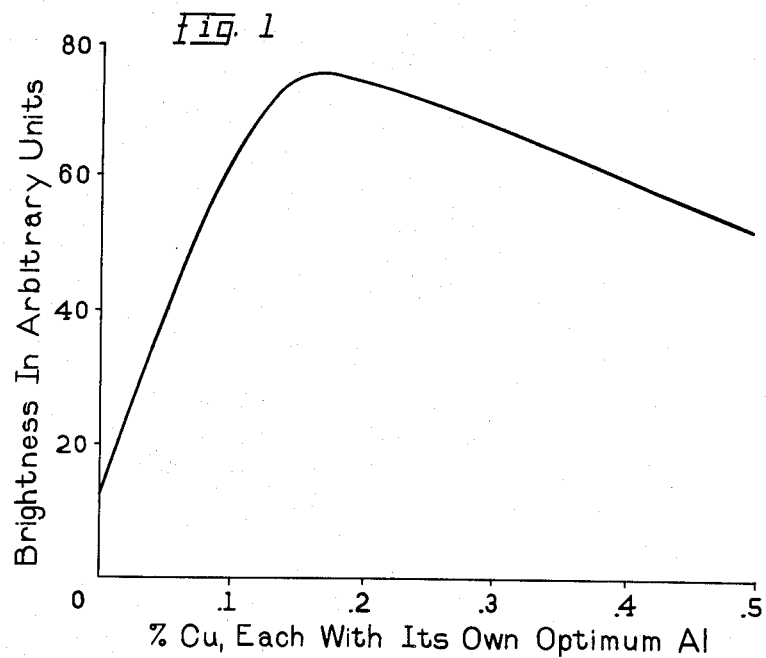

Inventor:
Herman C. Froelich,
by His Attorney.

United States Patent Office 2,743,240
Patented Apr. 24, 1956

2,743,240

ZINC-ALUMINUM SULPHIDE PHOSPHOR AND METHOD OF PREPARATION THEREOF

Herman C. Froelich, Cleveland Heights, Ohio, assignor to General Electric Company, a corporation of New York Application December 31, 1952, Serial No. 328,937

6 Claims. (Cl. 252—301.6)

My invention relates to luminescent materials or phosphors, and more particularly to zinc sulphide type phosphors and methods of preparation thereof. It is an object of my invention to provide a copper-activated zinc-aluminum sulphide phosphor which is particularly responsive to excitation by an electrical field (electroluminescent).

The well known copper-activated zinc sulphide phosphors emit only two bands of varying intensity, namely, a blue band at about 4500 Å. and a green band at about 5200 Å. It has been shown that in order that copper funtion as an activator in these conventional phosphors, roughly equivalent amounts of either monovalent negative halide ions or of trivalent positive ions such as aluminum must be present in the phosphor. In either case, identical emission bands of identical intensity may be obtained, depending upon the copper content and for copper concentrations of the usual amounts which are of the order of .001% to .01% Cu. Such phosphors are not electroluminescent.

I have also found, as disclosed and claimed in my application Serial No. 307,177, filed August 29, 1952, that a new series of zinc-aluminum sulphide phosphors with yellow or orange emission upon excitation by 3650 Å. radiation could be prepared if the molar amount of aluminum was at least equal to, and preferably in excess of, the molar amount of copper, if the copper content was considerably higher than that used for conventional phosphors, and if the firing was carried out in an atmosphere of hydrogen sulphide at temperatures of around 1100° C. Such phosphors, however, are not electroluminescent.

In accordance with the present invention, I have found that the addition of small amounts of oxygenous gases to a hydrogen sulphide firing atmosphere causes a complete change of emission characteristics of copper-activated zinc-aluminum sulphide phosphors. Over a certain range of compositions they become strongly responsive to electroluminescent excitation. With small amounts of oxygenous gases the electroluminescent emission is green and with larger amounts of oxides it becomes blue. The phosphors also fluoresce green under all other forms of excitation and over the entire range of suitable compositions. The same effect is produced by any one of several oxygenous gases such as water vapor, air, $CO_2$ or $SO_2$. After washing with sodium cyanide solution in known manner, the phosphors are found to retain less copper than was added before firing, although the amount of retained copper increases with increasing concentration of aluminum.

The brightest electroluminescent phosphors were prepared with about .15% added copper (by weight of the ZnS) and about .05% added aluminum corresponding to about 75 mole percent of the copper equivalent. However, good results were also obtained over the range of about .1% to .4% added copper and of aluminum equal to about 25 to 250 mole percent of the copper equivalent. Two specific examples of suitable compositions in accordance with the invention may be prepared as follows:

Example 1

20 grams of pure zinc sulphide are wetted down with solutions of .03 gram Cu and .01 gram Al in the form of soluble salts such as the nitrates, sulfates, chlorides, etc. In the case of sulfates, .12 gram $CuSO_4.5H_2O$ and .12 gram $Al_2(SO_4)_3.18H_2O$ are taken. This corresponds to .15% added Cu and to .75 mole Al per mole Cu. The mixture is dried, screened, and then fired at 1100° C. for one-half to one hour in an atmosphere of wet $H_2S$. For this purpose $H_2S$ gas is bubbled through a scrubber containing water or dilute $Ba(OH)_2$ solution at room temperature. The powder is kept in a flowing current of $H_2S$ gas during the entire period of firing and subsequent cooling. When cold, the powder is sieved through a 200 mesh screen, washed with a lukewarm solution of NaCN (say 5%) followed by water, and then dried. It is again screened through 200 mesh and is then ready for use.

Example 2

The procedure outlined in Example 1 is followed except that .06 gram Cu and .04 gram Al are used for 20 grams ZnS. In terms of sulfates, the amounts are .236 gram $CuSO_4.5H_2O$ and .50 gram $Al_2(SO_4)_3.18H_2O$. This corresponds to .3% added Cu and 1.57 moles Al per mole Cu, or about 0.2% by weight Al.

While I have employed firing temperatures in the range of 900–1200° C., the optimum temperature for most of the compositions was 1100° C., although a temperature of about 1000° C. seemed to be best for lower contents of aluminum.

In preparing the material, mixtures of ZnS and ZnO were found to be suitable as raw materials in place of pure ZnS. Even pure ZnO could be used as the starting material provided the oxide was first converted into sulphide by firing it in pure $H_2S$ at a lower temperature such as 700° C. If the oxide was fired directly in the oxide-containing $H_2S$ atmosphere at 1100° C., then electroluminescent responsive phosphors were obtained, but of blue instead of green emission color.

The admixture of oxygenous gases to the $H_2S$ atmosphere is most conveniently carried out when water vapor is employed. When bubbled through water or dilute $Ba(OH)_2$ solution at room temperature, a mixture of $H_2S$ with about 3% $H_2O$ is conveniently obtained and gives good results. To obtain mixtures with lower contents, the gas mixture may be passed through traps cooled to lower temperatures to freeze out excess water. The vapor pressure of ice at these lower temperatures is then assumed to determine the desired partial pressure of $H_2O$ in the emerging gas mixture. To obtain mixtures with more than 3% $H_2O$ the gas may be bubbled through heated water and the duct to the firing vessel may be heated to prevent condensation.

Green fluorescence and green electroluminescence are obtained over the range from about .01 to almost 100 per cent $H_2O$. The highest brightness, however, is obtained with mixtures of $H_2S$ with about 1% to 20% $H_2O$, by volume.

For mixtures containing air or $CO_2$, these gases may be added in slow currents to a stream of $H_2S$ gas by slowly displacing a contained volume of these gases in a flask with water and freezing out the water vapor in traps cooled to —57° C. At this temperature the vapor pressure of ice is 12 microns. Thus, water is effectively removed to the extent of about 1 part in 65,000. The resultant mixture with such lower water content acts as though it contained no water at all. The amounts of air or $CO_2$ that may be added reasonably well by this method range from 2% to 20%. The optimum range is about 2% to 5%, by volume, of either air or $CO_2$ in the $H_2S$.

When the phosphors are fired in atmospheres with large additions of oxygenous gases other than $H_2O$ (10, 20% or more) their electroluminescent response is a weak-to-medium bright blue regardless of the nature of the gas. When the amounts of oxide additions are small, the response is a pure green and varies in intensity mainly with the activator concentrations. For example, with 6% air the response was bright green, and with 3% air it was even brighter. Through variation of the firing time it was shown that it is mainly the concentration of air, not its absolute amount in contact with the powder, which determines phosphor brightness. Similarly, mixtures of $H_2S$ with $CO_2$ that contained about 2% to 5% $CO_2$ gave very bright green phosphors.

The results indicate that all oxygenous gases, when added to $H_2S$ in amounts from about .01 up to 5 or 10 per cent, by volume, will produce green Zn(Al)S:Cu phosphors. There is no significant difference in fluorescent color or brightness between phosphors fired with air, water vapor, or other oxide additives.

All phosphors, whether prepared with molar deficiencies or excess of aluminum, contained excess free copper sulphide which was removed with NaCN. While the solubility of $Cu_2S$ was substantially lower than in phosphors fired in pure dry $H_2S$, it was nevertheless larger than in the phosphors containing no aluminum, and it was dependent upon the aluminum concentration, increasing slightly with increasing aluminum additions. The removal of copper sulphide from the fired products increases the brightness and also reduces the conductivity of the phosphors so as to allow their use in electroluminescent cells without an insulating layer. It has been determined that the retained copper content is generally in the range of about 30 to 75 per cent of the amount added. In the case of Example 1 the retained copper content was 40%, and in Example 2 it was 50%, of the amount added.

The exact nature of the atmosphere to which the phosphors are exposed during the firing is not known. It is obvious that the addition of air or $CO_2$ to $H_2S$ will produce $H_2O$ and $SO_2$. Since all of these gases were equally effective in producing the changes stated above, it follows that it is the oxygen constituent of the gas mixture which, regardless of its nature, causes the changes in characteristics compared with the phosphors fired in pure $H_2S$.

The formation of Zn(Al)S:Cu phosphors with different emission and sensitivity characteristics is a fully reversible process. One type of phosphor may be readily converted into the other type merely by refiring for a short time in the appropriate atmosphere. Thus, a dry fired phosphor with yellow body color, orange 3650 Å, response, and lack of electroluminescent response, gave a tan-gray colored product with green ultraviolet and green electroluminescent response upon refiring in wet $H_2S$; this latter material, heated again in dry $H_2S$ (without removal of the excess copper sulphide) reverted to the first type, which on further firing in $H_2S$ plus air again gave the second type, etc.

Whereas ZnS:Cu phosphors fired in $H_2S$ give an orange emission with electroluminescent excitation, and when fired in atmospheres with oxide additions they luminesce mainly blue at both low and high frequencies, the addition of even very small amounts of aluminum to the phosphors prepared in accordance with the present invention changes their response completely, to a pure green. As little as 10 mole per cent aluminum relative to added copper effects the color change to green and, at the same time, increases the brightness fourfold. Moreover, the phosphors prepared with aluminum in accordance with the present invention retain the same green emission over a wide range of frequencies such as from 60 to 15,000 cycles per second. Previously known copper-activated zinc sulphide phosphors with green electroluminescent response changed in emission color from green through green-blue to blue as the frequency of the exciting current was increased. The presence of aluminum in even very small absolute and relative concentrations prevents this shift and allows the maintenance of the green emission at both low and high frequencies.

Figure 2:
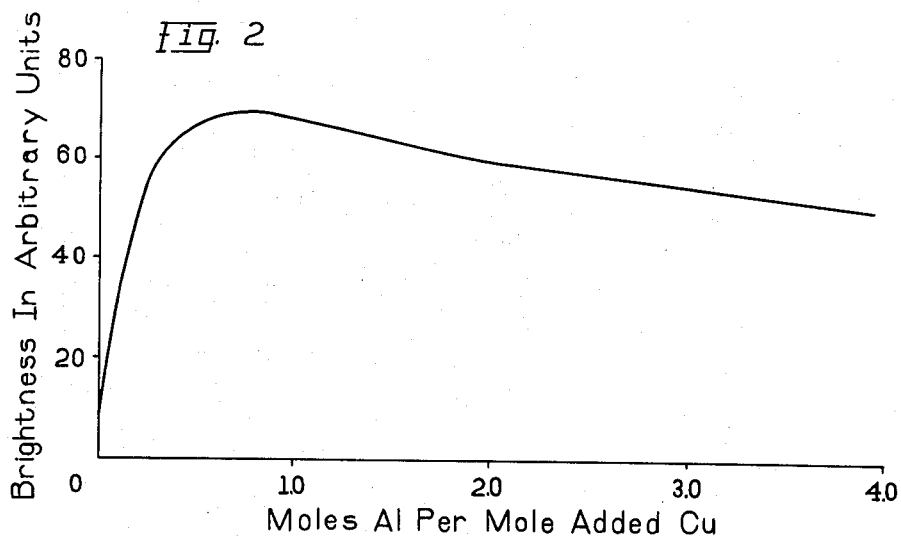

The effect of variation in content of copper and aluminum upon brightness of the phosphors is illustrated in the accompanying drawing wherein Figs. 1 and 2 are graphs on which are plotted the electroluminescent brightness readings of the phosphors as a function of added copper and aluminum contents, respectively.

Fig. 1 shows how the brightness depends upon the content of added copper, each with its own optimum aluminum concentration. While there is a maximum at .15% Cu (with .05% Al), a number of phosphors with somewhat more or less copper are almost equally bright. Thus, a range of copper concentrations from about .1 to .4 per cent added Cu give a brightness within 20% of the peak intensity provided by the optimum concentration.

Fig. 2 shows one of a family of curves, for one copper concentration and variable aluminum contents. It will be noted that the maximum in the curve is even flatter than in Fig. 1 and that compositions providing a brightness within about 20% of the peak intensity are provided with aluminum concentrations falling within the general range from about 25 to 250 mole per cent based on the amounts of added Cu.

While compositions within the general range of .1 to .4 per cent Cu and 25 to 250 mole per cent of Al all give about the same brightness within about 20%, I have found that the phosphors prepared with the higher activator concentration within the stated range give better maintenance in electroluminescent cells than the phosphors with the lower activator concentrations. Thus, the phosphor of the composition given in Example 2 had a better maintenance than the phosphor of Example 1, even though the two were of about the same brightness initially.

It is of interest to note that the maximum occurs at concentrations of aluminum that are lower than the copper equivalent, namely, at about .75 mole added Al per mole added Cu. It has also been determined that .75 is the fraction of retained Cu in terms of added Cu in these particular phosphors. It may therefore be concluded that the mole ratio of retained Cu to dissolved Al is actually 1:1 in the phosphors of highest brightness, as these materials did not contain any appreciable amount of non-soluble $Al_2O_3$.

The results obtained on ZnS phosphors with high copper and aluminum content and fired in pure dry $H_2S$ are best explained with the premise that these materials are true triple sulphides. Phosphors prepared in accordance with the present invention are probably heterogeneous and of more complicated structure than the dry fired materials. The tan-gray body color of these materials shows that the copper activator is present in some other association with the matrix lattice than in dry fired phosphors of the same retained copper content. The electroluminescent response is a direct consequence of the presence of oxides in the firing atmosphere and its intensity depends upon the amount of these oxides. The content of insoluble $Al_2O_3$ is slightly higher in the wet (oxygenous atmosphere) fired phosphors. It seems that the electroluminescent response is due to a solid oxide phase, providing barriers, which is distributed in extreme subdivision in or on the phosphor particles and in close physical contact with them.

It therefore seems reasonable to conclude that when fired in dry $H_2S$ nearly all added aluminum is converted into $Al_2S_3$ which, together with all added Cu in the form of $Cu_2S$, forms a solid solution with ZnS. Any non-converted $Al_2O_3$ survives in the form of separate sub-microscopic particles which are not closely associated with the triple sulphide in any form. They are mere diluents. The main phosphor phase is not responsive to electroluminescent excitation since it is homogeneous and has no oxide barriers.

Upon firing in atmospheres of $H_2S$ with oxide additions, the aluminum additive survives in the form of two phases. Most of the aluminum is converted into sulphide which is necessary to hold such relatively large amounts as .15% Cu in solid solution in the ZnS base material; it is not essential for the electroluminescent excitation itself. A smaller but significant portion of the added Al survives as $Al_2O_3$ in extreme subdivision in or on the phosphors; it does not contribute to the solubility of $Cu_2S$, but it is essential to provide the heterogeneous barriers for the electroluminescent excitation of the phosphors. Since only a portion of the added Al is converted to $Al_2S_3$, not all of the added Cu can be taken into solid solution. The balance survives the firing as free copper sulphide which is readily removable with NaCN.

What I claim as new and desire to secure by Letters Patent of the United States is:

1. The method of preparing an electroluminescent copper-activated zinc-aluminum sulphide phosphor which comprises firing at a temperature in the range of about 900–1200° C. and in an atmosphere of hydrogen sulphide containing about .01% to about 20% by volume of an oxygenous gas selected from the group consisting of air, water vapor, $CO_2$, $SO_2$ and mixtures thereof, a mixture of salts of aluminum and copper together with material of the group consisting of zinc sulphide and material which upon heating in the hydrogen sulphide atmosphere will yield zinc sulphide and which contains about .1% to .4% of copper, by weight of the zinc sulphide, and aluminum equal to about 25 to 250 mole per cent of the copper equivalent.

2. The method of preparing an electroluminescent copper-activated zinc-aluminum sulphide phosphor which comprises firing at a temperature in the range of about 900–1200° C. and in an atmosphere of hydrogen sulphide containing about .01% to about 20% by volume of an oxygenous gas selected from the group consisting of air, water vapor, $CO_2$, $SO_2$, and mixtures thereof, a mixture of zinc sulphide and salts of aluminum and copper in proportions providing about .1% to .4% copper, by weight of the zinc sulphide, and aluminum equal to about 25 to 250 mole per cent of the copper equivalent.

3. The method of preparing an electroluminescent copper-activated zinc-aluminum sulphide phosphor which comprises firing at a temperature of about 1100° C. and in an atmosphere of hydrogen sulphide containing about .01% to about 10% by volume of an oxygenous gas selected from the group consisting of air, water vapor, $CO_2$, $SO_2$ and mixtures thereof, a mixture of zinc sulphide and salts of aluminum and copper in proportions providing about .15% copper and .05% aluminum, by weight of the zinc sulphide.

4. The method of preparing an electroluminescent copper-activated zinc-aluminum sulphide phosphor which comprises firing at a temperature of about 1100° C. and in an atmosphere of hydrogen sulphide containing about .01% to about 10% by volume of an oxygenous gas selected from the group consisting of air, water vapor, $CO_2$, $SO_2$ and mixtures thereof, a mixture of zinc sulphide and salts of aluminum and copper in proportions providing about .3% copper and .2% aluminum, by weight of the zinc sulphide.

5. The method of preparing an electroluminescent copper-activated zinc-aluminum sulphide phosphor which comprises firing at a temperature in the range of about 900–1200° C. and in an atmosphere of hydrogen sulphide containing about 1% to 20% by volume of water vapor, a mixture of zinc sulphide and salts of aluminum and copper in proportions providing about .1% to .4% copper, by weight of the zinc sulphide, and aluminum equal to about 25 to 250 mole per cent of the copper equivalent.

6. An electroluminescent phosphor of copper-activated zinc aluminum sulphide containing copper in amount corresponding to about 0.1% to 0.4% added copper by weight of the zinc sulphide and aluminum equal to about 25 to 250 mole per cent of the added copper equivalent and wherein the electroluminescent response has been induced by firing at a temperature in the range of about 900–1200° C. and in an atmosphere of hydrogen sulphide containing about .01% to about 20% by volume of an oxygenous gas selected from the group consisting of air, water vapor, $CO_2$, $SO_2$ and mixtures thereof.

References Cited in the file of this patent

UNITED STATES PATENTS

| 2,623,858 | Kroger | Dec. 30, 1952 |
| 2,660,566 | Froelich | Nov. 24, 1953 |